United States Patent [19]

Ahn

[11] Patent Number: 5,026,181
[45] Date of Patent: Jun. 25, 1991

[54] RIBBON CARTRIDGE FOR AN ELECTRONIC TYPEWRITER

[75] Inventor: Myeong-Dal Ahn, Suwon, D.P.R. of Korea

[73] Assignee: SamSung Electronics Co., Ltd., Suwon Kyung Ki, Rep. of Korea

[21] Appl. No.: 358,411

[22] Filed: May 30, 1989

[30] Foreign Application Priority Data

Oct. 26, 1988 [KP] D.P.R. of Korea ............ 17347/1988

[51] Int. Cl.⁵ ................................................ B41J 35/28
[52] U.S. Cl. .................................. 400/208; 400/208.1
[58] Field of Search ................... 400/208, 208.1, 248, 400/194, 195, 196, 196.1

[56] References Cited

U.S. PATENT DOCUMENTS

| | | | |
|---|---|---|---|
| 4,299,504 | 11/1981 | Benz et al. | 400/208 |
| 4,317,636 | 3/1982 | Hume | 400/208 |
| 4,505,605 | 3/1985 | Hasewaga et al. | 400/208 |
| 4,657,418 | 4/1987 | Lahr | 400/208 |
| 4,729,677 | 3/1988 | Dirla et al. | 400/208 |
| 4,780,011 | 10/1988 | Hasgawa et al. | 400/208 |
| 4,830,524 | 5/1989 | Shore | 400/208 |

*Primary Examiner*—Edgar S. Burr
*Assistant Examiner*—Joseph R. Keating
*Attorney, Agent, or Firm*—Robert E. Bushnell

[57] ABSTRACT

There is disclosed a ribbon cartridge for an electronic typewriter. The cartridge includes a case for containing the ribbon, a supplying spool for supplying the ribbon, a winding spool for winding the ribbon supplied from the supplying spool, a tension member for tensioning the ribbon, a resiliently pressing means for contacting the winding spool with the winding gear, and a guide roll for guiding the ribbon. The tension member comprises an L-shaped spring, whose middle curved portion is supported on the spindle of the supplying spool. A first branch of the L-shaped spring is fixed on a corner structure, while a second branch thereof holds the ribbon to tension it. The resilient pressing means includes a pin spring resiliently pressing the spindle of the winding spool toward the winding gear. The side of the guide roll is tapered bidirecionally from the center line between the both ends thereof toward the both ends so that the ribbon is guided without being folded longitudinally.

20 Claims, 2 Drawing Sheets

RIBBON CARTRIDGE FOR AN ELECTRONIC TYPEWRITER

TECHNICAL BACKGROUND

The present invention concerns a ribbon cartridge for an electronic typewriter, and more particularly means for winding the ribbon with suitable tensioning and without the ribbon being folded.

In an electronic typewriter, if the hammer mounted on a carrier movable along a platen strokes a spoke of a print wheel, the character formed on the spoke collides along with an inked ribbon with a paper on the platen, thereby printing the character thereon. The ribbon is received into a cartridge, and mounted on the cartridge holder of the carrier. As the carrier moves along the platen, a ratchet mechanism causes the ribbon to be wound in a given direction.

Conventionally, a ribbon cartridge includes a supplying spool for supplying the ribbon and a winding spool for winding the ribbon supplied from the supplying spool. The drawbacks of the conventional ribbon cartridge are as follows:

First, the ribbon wound around the winding spool is frequently folded so that the contact of the winding spool and winding gear is adversely affected, thereby resulting in improper supplying of the ribbon;

Second, the construction of the resilient pressing means for forcefully contacting the moving winding spool, as the volume of the ribbon wound increases, with a winding gear is complicated;

Third, it is impossible to adjust the resilient force of the tension spring for tensioning the ribbon released from the supplying spool in accordance with the material and the width of the ribbon; and Fourth, the ribbon is plastically strained and becomes loosely elongated by the hammer stroking. If the elongated ribbon is loosely positioned in front of the hammer, the stroked portion of the ribbon can not pass the position of the hammer and therefore, the next character printed becomes dimmer.

SUMMARY OF THE INVENTION

It is an object of the present invention to provide an improved ribbon cartridge for winding the ribbon with suitable tensioning and without the ribbon being folded.

It is a further object of the present invention to provide a ribbon cartridge capable of adjusting resilient force of the tension spring mounted on a supplying spool and simplifying the construction of the resilient pressing means for forcefully contacting the winding spool with the winding gear.

It is an another object of the present invention to provide a ribbon cartridge capable of minimizing the deformation of the ribbon.

According to the present invention, a ribbon cartridge for an electronic typewriter comprises a case for containing the ribbon, the case having an outlet opening for letting out the ribbon and an inlet opening for letting in said ribbon, the two openings being spaced apart from each other enough to receive therebetween the hammer for pressing the ribbon to print characters, the two openings each having a guide for guiding the ribbon, the guide being sloped symmetrically to each other relative to the vertical plane intersecting the case along the meridian line between the two openings, a supplying spool for supplying the ribbon positioned behind the outlet opening in the case, a winding spool for winding the ribbon supplied from the supplying spool, the winding spool being positioned behind the inlet opening in the case, a winding gear for rotating the winding spool by resiliently contacting the winding spool, a tension member comprising a substantially L-shaped spring, the middle curved portion of the L-shaped spring being supported on the spindle of the supplying spool, a first branch of the L-shaped spring being fixed on a corner structure formed on the corner of the case, a second branch of the L-shaped spring holding the ribbon released from the supplying spool to tension the ribbon, the corner structure comprising a plurality of tension adjustment slots so that the second branch can hold the ribbon with variable tension force according to the position of the slot connected with the first branch, a resilient pressing means for contacting the winding spool with the winding gear, the resilient pressing means formed by a pin spring resiliently pressing the spindle of the winding spool toward the winding gear, a long guide groove formed for guiding the spindle of the winding spool as the ribbon wound around the winding spool is expanded so as to increase the space between the winding spool and the winding gear, and a guide roll disposed in front of the winding spool to guide the ribbon supplied from the supplying spool, a side of the guide roll being tapered bidirectionally from the center line between both ends thereof toward the both ends so that the ribbon is guided without being folded longitudinally.

The present invention will now be described more specifically with reference to the drawings attached only by way of example.

BRIFE DESCRIPTION OF THE ATTACHED DRAWINGS

DETAILED DESCRIPTION OF THE PREFERRED EMBODIMENT

Figure 1:
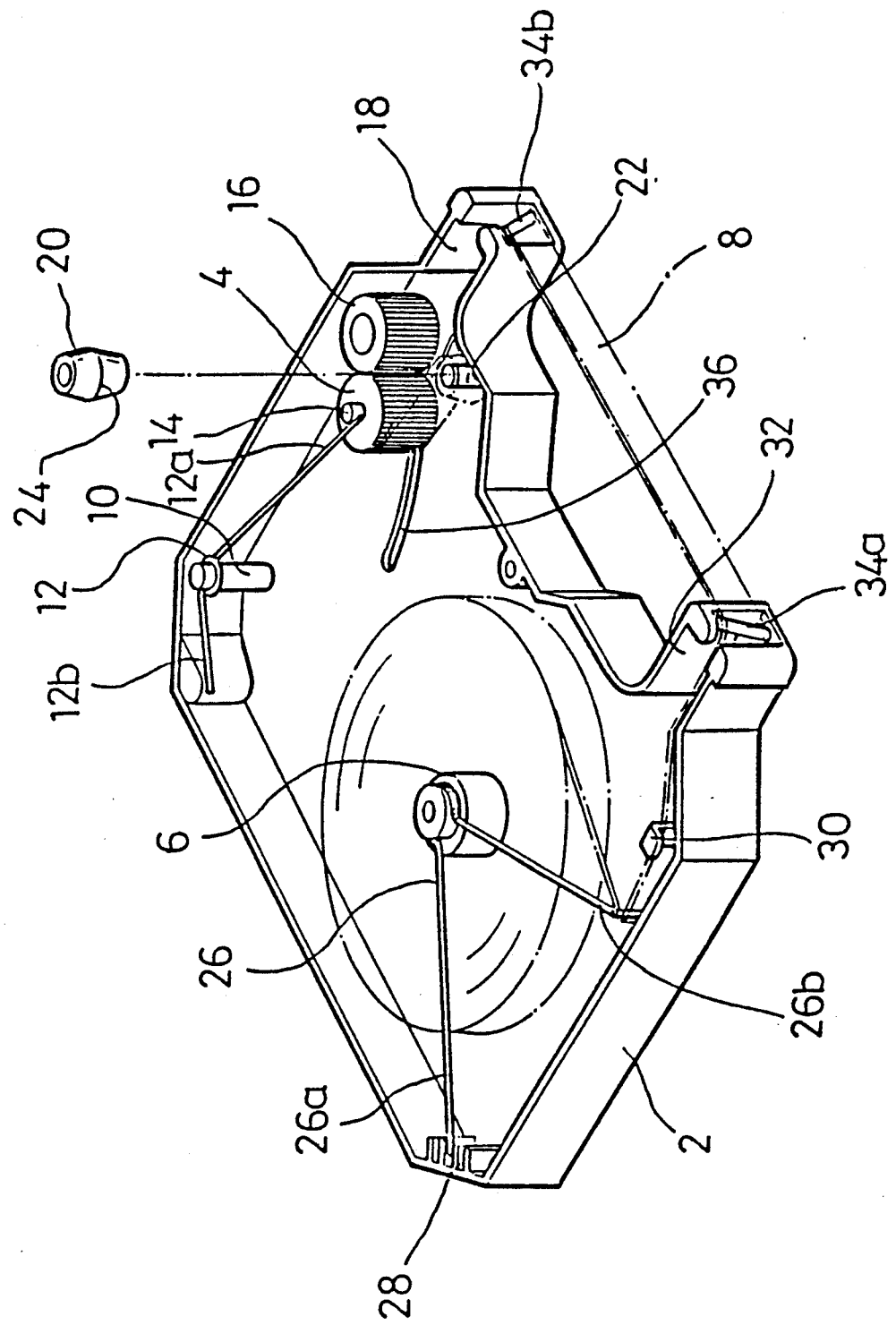
FIG. 1 is a perspective for illustrating the inventive structure, the upper plate being removed for showing the inside thereof.

Inside case 2 are rotatably mounted winding spool 4 and supplying spool 6, and the ribbon 8 is wound around the supplying spool 6 and moves to and around the winding spool 4. On the corner behind the winding spool 4 inside the case 2 is fixed a supporting protuberance 10 on which pin spring 12 is supported. One end 12a of the pin spring 12 presses resiliently the spindle 14 of the winding spool 4, while the other end 12b of the spring 12 is supported on the case 2.

To one side of the winding spool 4 is disposed the winding gear 16. By the resilient force of the spring 12 does the winding spool 4 contact continuously with the winding gear 16. Guide roll 20 is rotatably mounted on guide shaft 22 fixed adjacent to inlet opening 18 inside the case 2. The side of the guide roll 20 is tapered bidirectionally from the center line between the both ends of the guide roll toward the both ends. Namely, the portion along the center line between the both ends of the guide roll 20 is bulged, thereby forming a large diameter.

Tension member comprises a substantially L-shaped spring 26. The middle curved portion of the L-shaped spring 26 is supported on the spindle of the supplying spool 6. A first branch 26a of the spring 26 is fixed on a corner structure formed at the corner adjacent to the supplying spool 6. The corner structure comprises a plurality of tension adjustment slots 28. The branch 26a is inserted into one of the slots 28. A second branch 26b of the spring 26 holds the ribbon released from the supplying spool to tension the ribbon.

The ribbon 8 released from the supplying spool 6 is wound around the winding spool 4 by passing under the other end 26b of the spring 26, a guide piece 30 and outlet opening 32. The inlet opening 18 of the winding spool 4 and the outlet opening 32 of the supplying spool 6 have respectively a guide 34a, and 34b which is sloped symmetrically to each other relative to the vertical plane intersecting the case 2 along the meridian line between the two openings 18, 32. The reference numeral 36 indicates a long guide groove formed in the case 2 for guiding the spindle of the winding spool 4.

Figure 2:
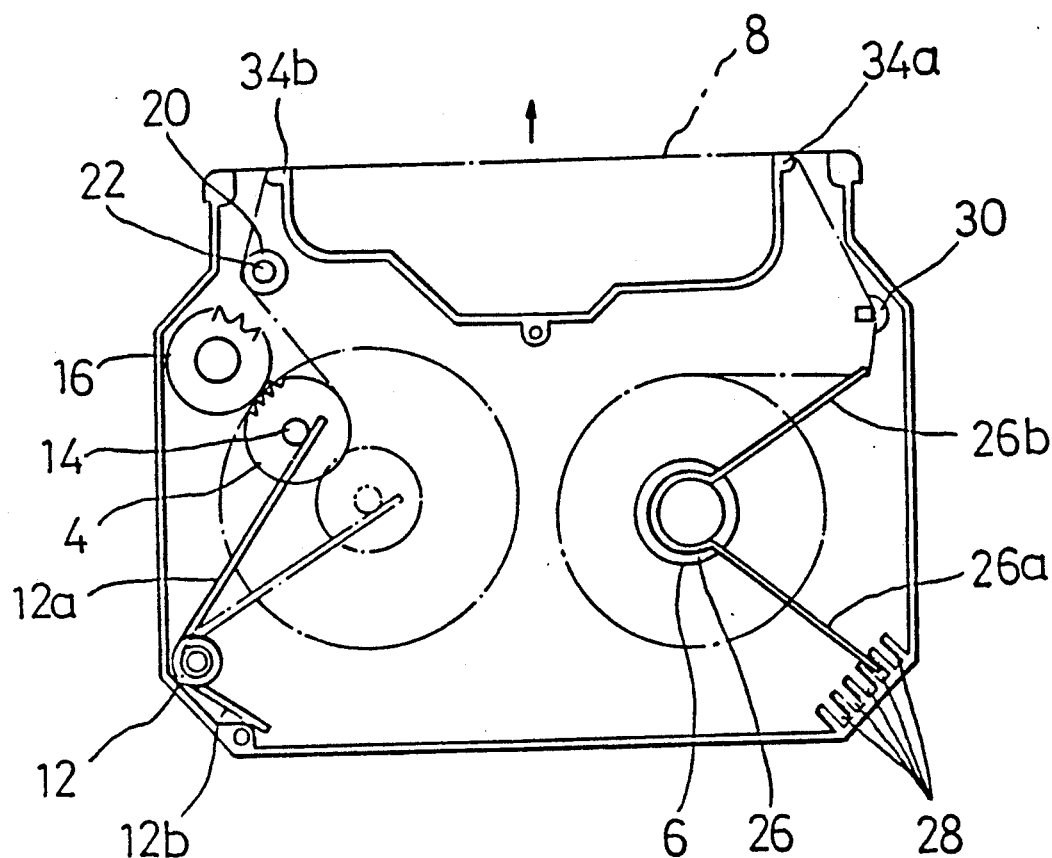
FIG. 2 is a plane view of FIG. 1 for illustrating the ribbon winding and the tensioning adjustment.

Referring to FIG. 2, as the winding gear 16 rotates in one direction by the ratchet mechanism (not shown) of the carrier, the ribbon released from the supplying spool 6 is wound around the winding spool 4. Here, the resilient force of the tension spring 26 for tensioning the ribbon 8 between the two guides 34a, 34b can be adjusted by selecting one of the slots 28 connected with the branch 26a. Therefore, the resilient force of the spring 26 can be suitably adjusted according to the width and material of the ribbon 8. Of course, when the tension spring 26 is itself deteriorated, it is also possible to improve the resilient force thereof by selecting the slot connected with branch 26a.

Figure 3:
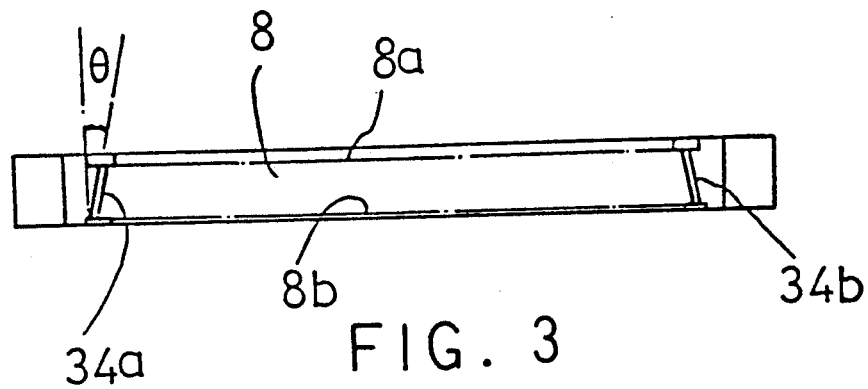
FIG. 3 is a frontal elevation of FIG. 1 for illustrating the ribbon stretching.

The part of the ribbon 8 stretched between the two guides 34a, 34b is plastically deformed by the hammer stroking, and becomes looser toward the platen (the direction of the arrow shown in FIG. 2). However, since the guides 34a, 34b are sloped symmetrically to each other so as to make the upper edge narrower than the lower edge of the part of the ribbon between the two guides as shown in FIG. 3, the resilient force of the tension spring 26 is concentrated on the lower edge 8b more than on the upper edge 8a of the ribbon 8, thereby the deformation occuring mainly in the lower edge 8b of the ribbon 8. Consequently, when the ribbon 8 is plastically strained by the hammer stroking, the lower edge 8b of the ribbon 8 becomes loosened by plastic deformation, while the upper edge 8a does not lose its inherent elasticity, recovering its original shape so as to make the used ribbon portion pass the position of the hammer. Thus, it is prevented that the printing of a character is dimmed owing to the hammer stroking the used ribbon portion.

Of course, if the guides 34a, 34b are sloped symmetrically to each other so as to make the lower edge narrower than the upper edge of the part of the ribbon between the two guides, the similar effect is produced. The sloping angle of the guides 34a, 34b is preferably within the range of 3–7 degrees.

Figure 4:
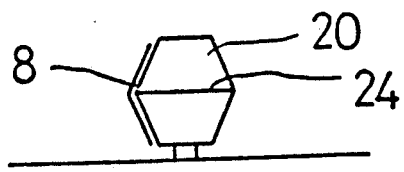
FIG. 4 is an operational view for illustrating the ribbon in contact with the guide roll.

The ribbon 8 is wound around the winding spool 4 by the winding gear 16, guided without being folded by the guide roll 20. Namely, as shown in FIG. 4, since the bulged portion 24 of the guide roll 20 causes the ribbon 8 to be bent longitudinally along the center line of the ribbon 8, the ribbon can not be folded, and the folded portion, if any, is spread out, guided to the winding spool 4.

Additionally, since the winding spool 4 is resiliently contacted with the winding gear 16 by the end 12a of the spring 12, its construction is simplified.

While the invention has been particularly shown and described with reference to a preferred embodiment, it will be understood by those skilled in the art that modifications in detail may be made without departing from the spirit and scope of the invention.

What is claimed is:

1. A ribbon cartridge for an electronic typewriter, comprising:

a case for containing a ribbon therein, said case having an outlet opening for letting out the ribbon and an inlet opening for letting in the ribbon, said outlet and inlet openings being spaced apart from each other enough to receive therebetween a hammer for pressing the ribbon to print characters, said outlet and inlet openings each having a guide for guiding the ribbon, said guides being sloped symmetrically relative to each other, a supplying spool including a spindle, said supplying spool being for supplying the ribbon positioned behind said outlet opening in said case, a winding spool for winding the ribbon supplied from said supplying spool, said winding spool being positioned behind said inlet opening in said case, a winding gear for rotating said winding spool by resiliently contacting said winding spool, a tension member comprising a substantially L-shaped spring, middle curved portion of said L-shaped spring being supported on a spindle of said supplying spool, a first branch of said L-shaped spring being fixed on a corner structure formed on the corner of said case, a second branch of said L-shaped spring holding the ribbon released from said supplying spool to tension the ribbon, said corner structure comprising a plurality of tension adjustment slots so that the second branch can hold said ribbon with variable tension force according to the position of one of said adjustment slots receiving said first branch, resilient pressing means for contacting said winding spool with said winding gear, said resilient pressing means comprising a pin spring resiliently pressing the spindle of said winding spool toward said winding gear, a long guide groove formed in said case for guiding the spindle of said winding spool as the ribbon wound around said winding spool is expanded so as to increase the space between said winding spool and said winding gear, and a guide roll positioned between said guide of said inlet opening and said winding spool, said guide roll being tapered bidirectionally from the center line between the both ends thereof toward the both ends whereby said guide roll guides and disengages the ribbon to travel from said guide roll and onto said winding spool.

2. A ribbon cartridge as claimed in claim 1, characterized in that the said guides define a symmetrical sloping angle within the range of 3°–7°.

3. A typewriter ribbon cartridge, comprising:

means for containing a ribbon, said containing means having spaced apart outlet and inlet openings permitting passage of the ribbon engagable by a print hammer, a plurality of first means disposed in each of said openings for guiding the ribbon, said first guiding means being sloped symmetrically relative to each other, supply spool means including a spindle, said supplying spool means being positioned within said containing means, for supplying the ribbon, winding spool means positioned within said containing means, for receiving the ribbon from said supply spool means, means for rotating said winding spool means, a first spring having a middle curved portion supported on a spindle of said supply spool means, a first branch of said first spring engaging said case and, a second branch of said first spring applying tension to portions of the ribbon released from said supply spool means, means formed in said case for guiding the spindle of said winding spool means as portions of the ribbon wound around said winding spool means expanded and for accommodating an increase in space between said winding spool means and said rotating means, and a guide roll rotatably mounted between said first guide means at said inlet opening and said winding spool means to engage and release the ribbon directly onto said winding spool means, said guide roll having an exterior surface tapered bidirectionally from a lesser diameter at opposite ends to a greater diameter toward a center of the roll.

4. A ribbon cartridge as set forth in claim 3, characterized in that said first guiding means each define a symmetrical sloping angle within the range of 3°-7°.

5. A ribbon cartridge as set forth in claim 3, wherein said containing means comprises a corner structure providing a plurality of tension adjustment slots positioned to receive said first branch, whereby said second branch may hold said ribbon with variable tension force according to the position of the slot receiving said first branch.

6. A ribbon cartridge as set forth in claim 4, wherein said containing means comprises a corner structure providing a plurality of tension adjustment slots positioned to receive said first branch, whereby said second branch may hold said ribbon with variable tension force according to the position of the slot receiving said first branch.

7. A ribbon cartridge as set forth in claim 3, further comprising means for biasing said winding spool means with said rotating means, said biasing means comprising a second spring resiliently pressing the spindle of said winding spool means towards said rotating means.

8. A ribbon cartridge as set forth in claim 4, further comprising means for biasing said winding spool means with said rotating means, said biasing means comprising a second spring resiliently pressing the spindle of said winding spool means towards said rotating means.

9. A ribbon cartridge as set forth in claim 5, further comprising means for biasing said winding spool means with said rotating means, said biasing means comprising a second spring resiliently pressing the spindle of said winding spool means towards said rotating means.

10. A ribbon cartridge as set forth in claim 6, further comprising means for biasing said winding spool means with said rotating means, said biasing means comprising a second spring resiliently pressing the spindle of said winding spool means towards said rotating means.

11. A typewriter ribbon cartridge, comprising:

means for containing a ribbon, said containing means permitting passage of a ribbon engagable by a print hammer, a plurality of first means disposed for guiding the ribbon, each of said plurality of first guiding means being sloped symmetrically relative to each other, supply means positioned within said containing means, for supplying the ribbon, winding spool means including a spindle, said winding spool means being positioned within said containing means, for receiving said ribbon from supplying means, means for rotating said winding spool, means formed in said case for guiding the spindle of said winding spool as the ribbon wound around said winding spool is expanded and accommodating an increase in space between said winding spool means and said rotating means, and a first spring having a curved middle portion supported on a spindle of said supplying spool, a first branch of said first spring engaging said case and, a second branch of said spring applying tension to portions of ribbon released from said supplying spool, wherein said containing means comprises a structure providing a plurality of tension adjustment slots positioned to receive said first branch, whereby said second branch may hold the ribbon with variable tension force according to the position of the slot receiving said first branch.

12. A ribbon cartridge as set forth in claim 11, characterized in that said plurality of first guide means each define a symmetrical sloping angle within the range of 3° through 7°.

13. A ribbon cartridge as set forth in claim 11, further comprised of a guide roll rotatably mounted between said first guide means and said winding spool means to engage and direct the ribbon immediately onto said winding spool means, said guide roll having an exterior surface tapered in opposite directions from a lesser diameter at opposite ends to a greater diameter toward a center of the roll.

14. A ribbon cartridge as set forth in claim 12, further comprised of a first spring having a middle curved portion supported on a spindle of said supplying spool, a first branch of said first spring engaging said case and, a second branch of said first spring applying tension to ribbon released from said supplying spool, wherein said containing means comprises a corner structure providing a plurality of tension adjustment slots positioned to receive said first branch, whereby said second branch may hold the ribbon with variable tension force according to the position of the slot receiving said first branch.

15. A ribbon cartridge as set forth in claim 11, further comprising means for biasing said winding spool means against said rotating means, said biasing means comprising a spring resiliently pressing the spindle of said winding spool means towards said rotating means.

16. A ribbon cartridge as set forth in claim 12, further comprising means for biasing said winding spool means towards said rotating means, said biasing means comprising a spring resiliently pressing the spindle of said winding spool towards said rotating means.

17. A ribbon cartridge as set forth in claim 13, further comprising means for biasing said winding spool means towards said rotating means, said biasing means comprising a second spring resiliently pressing the spindle of said winding spool towards said rotating means.

18. A ribbon cartridge as set forth in claim 14, further comprising means for biasing said winding spool means towards said rotating means, said biasing means comprising a second spring resiliently pressing the spindle of said winding spool towards said rotating means.

19. A ribbon cartridge as set forth in claim 3, wherein said guide roll is disposed to receive the ribbon directly from one of said plurality of first guide means and to disengage the ribbon to travel directly onto said winding spool means.

20. A ribbon cartridge as set forth in claim 1, wherein said guide roll is disposed to receive the ribbon directly from said guide at said inlet opening and to disengage the ribbon to travel directly onto said winding spool.

* * * * *